April 25, 1961 T. RUMMEL 2,981,605
METHOD OF AND APPARATUS FOR PRODUCING HIGHLY
PURE RODLIKE SEMICONDUCTOR BODIES
Filed Nov. 17, 1958

Inventor:
Theodor Rummel
By [signature] Atty.

United States Patent Office 2,981,605

Patented Apr. 25, 1961

2,981,605

METHOD OF AND APPARATUS FOR PRODUCING HIGHLY PURE RODLIKE SEMICONDUCTOR BODIES

Theodor Rummel, Munich, Germany, assignor to Siemens and Halske Aktiengesellschaft Berlin and Munich, a corporation of Germany Filed Nov. 17, 1958, Ser. No. 774,413

Claims priority, application Germany Dec. 19, 1957

13 Claims. (Cl. 23—223.5)

This invention relates to a method of and apparatus for producing highly pure rodlike semiconductor bodies, and is particularly concerned with improvements applicable to a prior method (disclosed in copending application Serial No. 509,351, filed May 19, 1955) of producing purest substances for semiconductor purposes, for example, silicon or germanium, from a gas phase, preferably by thermal decomposition, in which the separated silicon or germanium is precipitated or deposited upon a carrier body consisting of like material, namely, of silicon or germanium, respectively.

In a preferred mode of operation for producing highly pure rodlike semiconductor bodies, especially silicon bodies, a highly purified compound of the semiconductor substance which is to be obtained is brought into contact with a wirelike carrier body consisting likewise of highly pure semiconductor material and heated by direct passage of current therethrough, some compound preferably flowing along the carrier body longitudinally there, whereby the semiconductor substance formed incident to decomposition of the compound, is deposited upon the carrier body, crystallizing thereon, and thereby causing the solid carrier body to increase in size and especially, to increase in thickness so as to form a rod.

It is in such operation and for the duration thereof desirable to maintain the surface temperature of the carrier body at an optimum required for the separation of the semiconductor substance and for the crystallization of the liberated substance on the carrier body. It is moreover necessary to prevent increase of the current flowing through the carrier, due to the negative temperature characteristic of the specific resistance of the given semiconductor substance, to such an extent that the carrier is melted. It is accordingly necessary to supervise the temperature obtaining on the surface of the carrier and to effect at least responsive to greater temperature fluctuations instantaneous regulation of the current employed for heating the carrier and keeping it at high temperature.

In accordance with the invention, the heating current flowing through the carrier is for this purpose for the duration of the operation controlled and regulated to operate at a value corresponding to the momentarily desired surface temperature, such regulation and control being effected by alteration of the inductive impedance of a choke coil connected in the circuit of an alternating current which determines the magnitude of the heating current. The arrangement may be such that the alternating current regulated by the choke coil is employed, if desired after rectifying, as heating current flowing through the carrier. However, the alternating current which is regulated according to the invention, may be employed for regulating a generator or another suitable current source which may be utilized to supply the heating current. The first mentioned arrangement is, however, preferred.

Figures 1, 1A:
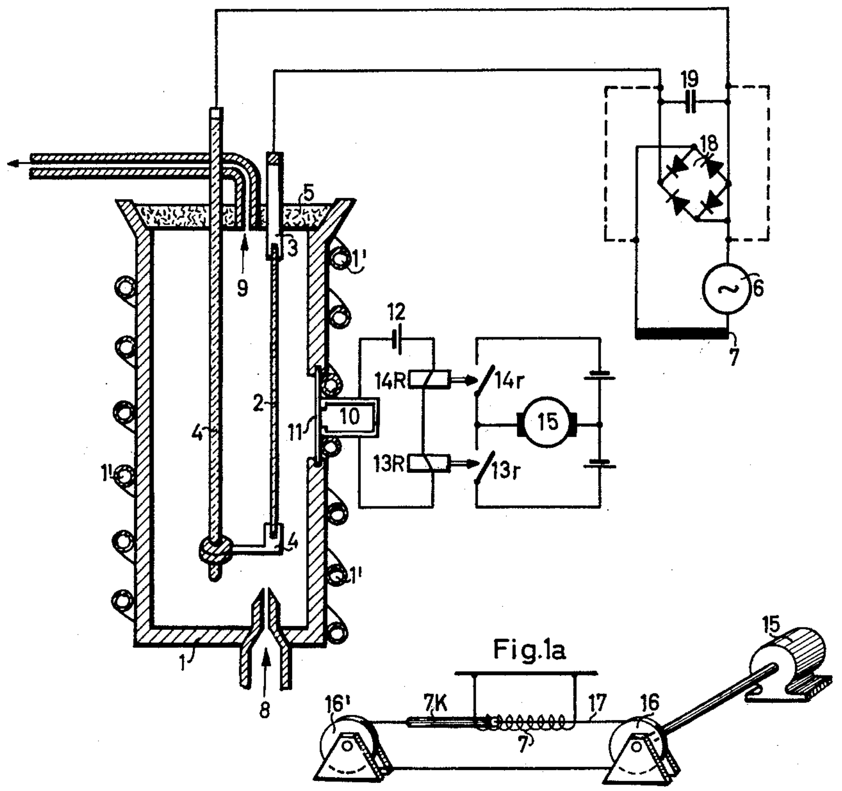
Figure 2:
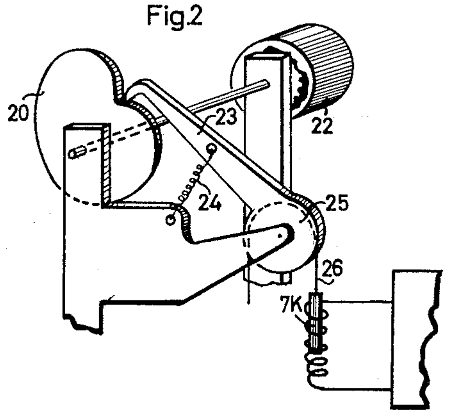

The various objects and features of the invention will appear in the course of the description which is rendered below with reference to the accompanying drawing, wherein Fig. 1 shows an example of an embodiment in which the carrier is heated by alternating current flowing directly therethrough, the carrier to be heated being in series with the choke coil which regulates the current inductively;

Fig. 1*a* illustrates a device for adjusting the inductive impedance of the choke coil; and Fig. 2 shows another example of a device for varying the inductive impedance of the choke coil.

Referring now to Fig. 1, numeral 1 indicates a reaction vessel having copper walls which are cooled by a cooling coil 1'. Numeral 2 indicates a wirelike carrier consisting of pure semiconductor substance, for example, silicon, disposed vertically and held by electrodes 3 and 4. The two electrodes 3 and 4 are fastened to the cover 5 so as to facilitate assembly. The electrodes 3 and 4 are at the parts which contact the silicon wire 2 made of heatproof material which is indifferent against the semiconductor substance, for example, of spectral carbon or tungsten or, if desired, of silicon, and are connected to an alternating current source 6, which may, for example, be a commercial current source, and to a choke coil 7 with adjustable self-induction. The purified reaction gas, for example, a mixture of silicon tetrachloride and hydrogen enters the reaction vessel 1 through a nozzle 8, flows along the wire 2 and leaves the vessel at 9.

The reaction vessel is prior to the operation evacuated and the silicon carrier 2 is preheated (for example, by means of heat radiator, not shown, or by applying high voltage which is subsequently reduced) so as to impart to it an initial conductivity sufficient for carrying out the operation, and is thereupon held at reaction temperature by direct passage of current therethrough. The inductive impedance of the choke coil 7 is so adjusted that the alternating current which can pass suffices to maintain the carrier 2 in the presence of the flowing reaction gas at the desired working temperature.

The temperature of the carrier 2 is during the operation supervised by means of a measuring device 10 through a cooled window 11 disposed in the wall of the reaction vessel. The measuring device 10 may, for example, be an optical pyrometer which indicates deviations of the temperature of the carrier 2 from a desired value. The inductive impedance of the choke coil is thereupon changed so that the current alteration which is thereby effected compensates the ascertained deviation of the temperature of the carrier 2. The alteration of the inductive impedance of the choke coil which may, for example, be constructed in the manner of a variometer, is in known manner effected, for example, by moving a core of relatively loss-free highly permeable material, for example, ferrite, in defined manner relative to the interior of the coil 7, or by defined short-circuiting or mutual relative motion of some of its windings. It is also possible to effect the alteration of the inductive impedance by alteration of the alternating current frequency. There is moreover the possibility of altering the inductance of the choke coil 7 by the use of a coil core with controllable magnetization, by effecting this magnetization by the alteration of the magnetizing current.

The control of the surface temperature of the carrier 2 and the regulation of the alternating current for the heating of the carrier required therefor, may be effected automatically. An example of such control is provided in Fig. 1 which may in principle operate as follows:

In the neighborhood of the heated carrier, for example, at the cooled window 11 may be disposed a measuring device 10, for example, a selectively operating photocell which reacts to the temperature radiation of the carrier in defined and positive manner and converts temperature fluctuations of the carrier 2 into fluctuations of an electric current delivered by a current source 12. This current, if desired after amplification thereof, is utilized for controlling switch devices 13R and 14R. One of these switching devices closes a circuit when the current exceeds the desired value, resulting in increased temperature of the carrier, and the other switching device closes a circuit responsive to reduced current, resulting in lowering of the temperature of the carrier.

The switching devices are relays 13R, 14R. The relay 13R is so adjusted that its armature is not attracted when the current is of the desired value, causing, however, attraction of the armature when the current exceeds the desired value and thereby closing at contact 13*r* a circuit for a servo motor 15 which operates, as illustrated in Fig. 1*a*, to immerse the core 7K deeper into the choke coil 7, thus increasing the inductive impedance thereof. Relay 14R is so adjusted that its armature is just attracted when the current delivered by the photocell 10 has the desired value, causing, however, release of the armature responsive to decrease of the current below its desired value. A circuit is thus closed at contact 14*r* for causing the servo motor 15 to move the core 7K from the choke coil so as to reduce the inductive impedance thereof. The displacement of the core 7K relative to the coil 7 is effected by a string 17 extending over rollers 16, 16′ operated by the servo motor 15 in one or the other direction depending upon its sense of rotation controlled by the relays 13R and 14R.

If the heating of the carrier 2 is to be effected with direct current, a rectifier circuit 18 cooperating with a smoothing capacitor 19 may be inserted in the circuit of the alternating current source 6 and the carrier 2.

Another possibility of regulating or controlling the current for heating the carrier resides, in accordance with the invention, in ascertaining and controlling by experiments, based upon the desired course of the surface temperature of the carrier, the course of the alteration of a working parameter which positively determines the surface temperature, and utilizing such parameter in the working operation under the same conditions as in the experimental procedure, for the regulation of the surface temperature of the carrier. This procedure is more in detail explained below.

The apparatus for carrying out the method is first used in a test, starting with a carrier, for example, a silicon carrier, of predetermined length and predetermined thickness. The amount of reaction gas of defined combination flowing in a time unit along the carrier, is ascertained and maintained during the test. This also applies to the working temperature. The current which is to be altered from time to time so as to obtain a constant working temperature, is ascertained in predetermined time intervals, and is recorded in the form of a curve or table. The course of the current values in relation to time serves as a standard for subsequent repetition of the operations under identical conditions. Deviations from this standard will directly point to deviations of the temperature of the carrier from a desired value and such deviations are compensated by altering the inductive impedance of the choke coil 7 either manually or automatically. The desired value of the voltage drop occurring along the thickening semiconductor carrier may be similarly utilized as a standard.

Fig. 2 shows an example of an embodiment for effecting the automatic control or regulation in accordance with the above explained principle. Numeral 20 indicates a cam conforming to the experimentally obtained curve of the course of the values of the desired heating current in relation to time. This cam is carried by a rotatable shaft which is driven by a clock mechanism 22 at a speed of rotation corresponding to the desired course of the control in relation to time. The free end of a lever arm 23 extending from a rotatably disposed roller 25 is held in engagement with the cam 20 by means of a spring 24 and such lever is accordingly responsive to rotation of the cam angularly displaced by amounts changing with time, thereby angularly rotating the roller 25 in corresponding manner, the roller 25 acting in the fashion of a pulley to displace a string 26 for controlling the varying immersion of the core 7K in the choke coil in accordance with the curve of the cam 20.

The advantage resulting from the invention resides above all in a loss-free, inertia-free control of the current for heating the carrier, such control being as compared with purely ohmic control unaffected by specific material constants which change with the degree of heating.

Changes may be made within the scope and spirit of the appended claims in which is defined what is believed to be new and desired to have protected by Letters Patent.

I claim:

1. In a method of producing highly pure rodlike semiconductor bodies by causing a highly purified compound of the desired semiconductor substance to flow along and longitudinally of a wirelike carrier made of corresponding highly pure semiconductor material, said carrier being heated by direct galvanic passage of current therethrough, whereby said compound is decomposed to effect separation of the desired semiconductor substance therefrom and deposition thereof upon said carrier on which said deposited substance crystallizes so as to increase the thickness of said carrier to form a rodlike body, the improvement which comprises regulating and controlling during the carrying out of the method the heating current flowing through said carrier to a value corresponding at any instant to the surface temperature of said thickening carrier by alteration of the inductive impedance of a choke coil connected in the circuit of an alternating current which determines the value of the heating current to be applied.

2. The improvement according to claim 1, comprising rectifying the alternating current controlled by said choke coil, said rectified current constituting said heating current.

3. The improvement according to claim 1, comprising continuously ascertaining the temperature of said carrier by temperature responsive means, and compensating ascertained deviations from desired temperature values by alteration of the inductive impedance of said choke coil.

4. The improvement according to claim 1, comprising automatically effecting said control and regulation by converting fluctuations of the surface temperature of said carrier into fluctuations of an electric current delivered by a measuring device controlled by said surface temperature, said delivered electric current governing a first and a second device for respectively closing a first circuit when the temperature of the carrier and therefore the heating current exceeds the desired magnitude, and a second circuit when the temperature of the carrier and therefore the heating current are below the desired magnitude, the closure of said circuits respectively effecting altering the inductive impedance of said choke coil in opposite directions.

5. The improvement according to claim 1, comprising experimentally obtaining a record of the desired course of the current for effecting the required surface temperature in relation to time, and controlling the course of the current for heating said carrier in accordance with said record.

6. The improvement according to claim 1, wherein said choke coil is formed in the manner of a variometer, comprising altering the inductive impedance of said choke coil by alteration of the self-induction thereof.

7. The improvement according to claim 6, wherein the self-induction of said choke coil is varied by controlled displacement of a core of loss-free highly permeable material relative to the magnetic field of said choke coil.

8. The improvement according to claim 6, wherein the self-induction of said choke coil is varied by defined short-circuiting of windings thereof.

9. The improvement according to claim 6, wherein the inductive impedance of said choke coil is varied by pre-magnetization of the core thereof.

10. In a system for producing highly pure rodlike semiconductor bodies by causing a highly purified compound of the desired semiconductor substance to flow along and longitudinally of a wirelike carrier made of corresponding highly pure semiconductor material, said carrier being heated by direct galvanic passage of current therethrough, whereby said compound is decomposed to effect separation of the desired semiconductor substance therefrom and deposition thereof upon said carrier on which said deposited substance crystallizes so as to increase the thickness of said carrier to form a rodlike body, apparatus for automatically regulating and controlling the heating current flowing through said thickening carrier to maintain the magnitude of said heating current to correspond at any instant to the surface temperature of said thickening carrier, said apparatus comprising an alternating current source, a choke coil connected to said alternating current source in series with said carrier, a device for continuously ascertaining the surface temperature of said thickening carrier, and means controlled by said device for varying the inductive impedance of said choke coil in accordance with surface temperature variations of said thickening carrier ascertained by said device to vary the magnitude of the heating current flowing through said thickening carrier.

11. Apparatus according to claim 10, comprising means for rectifying the alternating current controlled by said choke coil, said rectified current constituting said heating current.

12. Apparatus according to claim 10, wherein said device comprises measuring means for converting fluctuations of surface temperature of said thickening carrier into fluctuations of electric current, a first relay operatively controlled by said current fluctuations when said heating current exceeds a desired magnitude, a second relay operatively controlled by said current fluctuations when said heating current is below a desired magnitude, and motor means controlled by said relays for varying the inductive impedance of said choke coil in accordance with the operation of said relays.

13. Apparatus according to claim 12, comprising core means cooperating with said choke coil, and means controlled by said motor means for varying the immersion of said core means in said choke coil to vary the inductive impedance thereof.

References Cited in the file of this patent

UNITED STATES PATENTS

| | | |
|---|---|---|
| 1,336,017 | Bibby et al. | Apr. 6, 1920 |
| 1,650,072 | Jonas et al. | Nov. 22, 1927 |
| 2,291,007 | Titcomb | July 28, 1942 |
| 2,422,734 | Jung | June 24, 1947 |
| 2,514,935 | Clapp | July 11, 1950 |
| 2,745,067 | True et al. | May 8, 1956 |
| 2,782,246 | Evans | Feb. 19, 1957 |
| 2,808,316 | Hall | Oct. 1, 1957 |
| 2,854,318 | Rummel | Sept. 30, 1958 |